United States Patent [19]
Mizukata et al.

[11] Patent Number: 6,020,872
[45] Date of Patent: *Feb. 1, 2000

[54] MATRIX-TYPE DISPLAY DEVICE AND METHOD FOR DRIVING THE SAME

[75] Inventors: Katsuya Mizukata, Shijonawate; Manabu Tanaka, Sakurai, both of Japan

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/813,490

[22] Filed: Mar. 7, 1997

[30] Foreign Application Priority Data

Mar. 22, 1996 [JP] Japan ................................... 8-066933

[51] Int. Cl.⁷ .................................................. G09G 3/36
[52] U.S. Cl. ............................................ 345/99; 345/213
[58] Field of Search .............................. 345/98, 99, 100, 345/208, 213, 103; 348/792, 790–791

[56] References Cited

U.S. PATENT DOCUMENTS

| | | | |
|---|---|---|---|
| 4,193,037 | 3/1980 | Kyu | 377/110 |
| 4,464,067 | 8/1984 | Hanaoka | 374/170 |
| 4,606,050 | 8/1986 | Sekigawa et al. | 375/75 |
| 4,757,311 | 7/1988 | Nakamura et al. | 340/731 |
| 5,303,046 | 4/1994 | Masuda | 348/500 |
| 5,408,252 | 4/1995 | Oki et al. | 345/98 |
| 5,598,177 | 1/1997 | Mizukata et al. | 345/92 |
| 5,602,561 | 2/1997 | Kawaguchi et al. | 345/99 |
| 5,682,175 | 10/1997 | Kitamura | 345/100 |

FOREIGN PATENT DOCUMENTS

| | | |
|---|---|---|
| 131182 | 6/1991 | Japan . |
| 20816 | 1/1995 | Japan . |
| 250256 | 9/1995 | Japan . |

OTHER PUBLICATIONS

Kabuto et al, "Zooming Function for A Liquid Crystal TV", The Institute of Television Engineers of Japan, 1989, pp. 237–238.

Patent Abstracts of Japan, vol. 018, No. 298 (P–1749), Jun. 7, 1994, & JP 06 059643 A (Fujitsu General Ltd.) Mar. 4, 1994.

Patent Abstracts of Japan, vol. 017, No. 421 (E–1409), Aug. 5, 1993 & JP 05 083658 A (Sanyo Electric Co. Ltd.) Apr. 2, 1993.

*Primary Examiner*—Amare Mengistu
*Attorney, Agent, or Firm*—Nixon & Vanderhye P.C.

[57] ABSTRACT

According to a driving method of a matrix-type display device of the present invention, a reference clock signal supplied by a reference clock oscillator is divided by a plurality of frequency dividing circuits, so that division clock signals are obtained. One among the division clock signals is selected by a switching operation by a switching circuit, and the selected division clock signal is outputted as a sampling clock signal to a row electrode driving circuit. Timings for the switching operation of the switching circuit are controlled by a switching control circuit in accordance with a horizontal synchronization signal and the reference clock signal. One or more of the frequency dividing circuits outputs a division clock signal having unequal clocks, when necessary. By thus arranging the division clock signals so that they have unequal clocks, it is allowed to set N of the division ratio 1/N to a value other than an integral number. Therefore, it is possible to set the division ratios close to each other, and hence, it is ensured that the reference clock signal has a lower frequency.

16 Claims, 12 Drawing Sheets

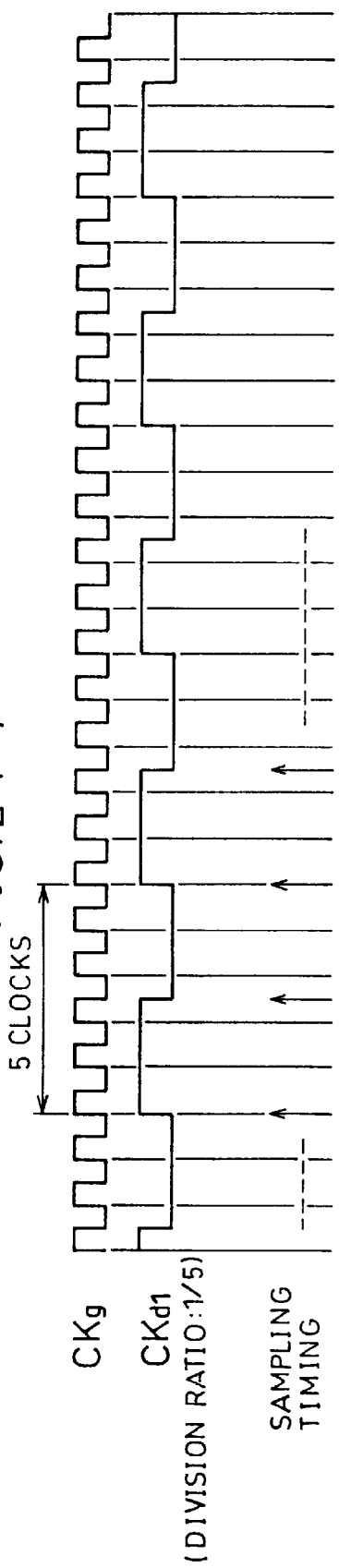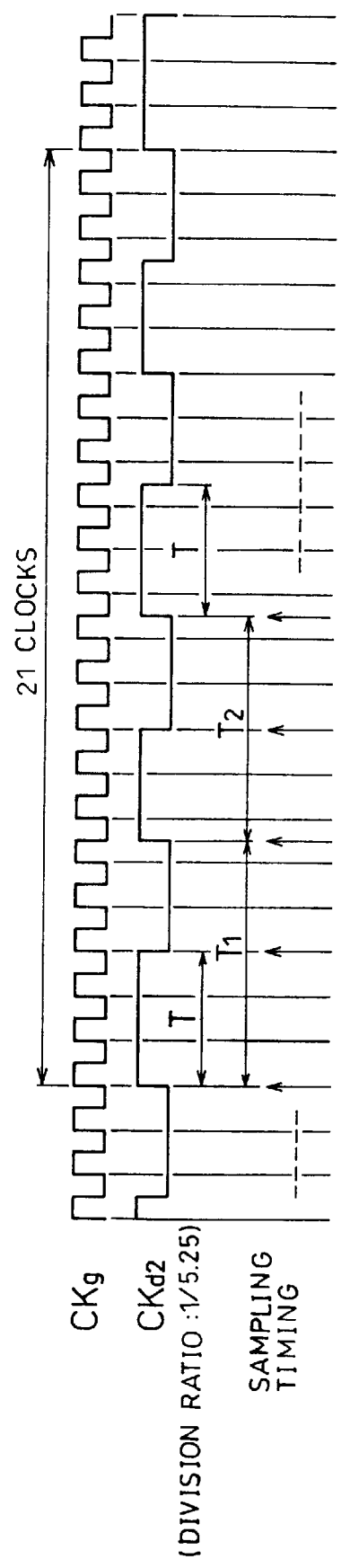

MATRIX-TYPE DISPLAY DEVICE AND METHOD FOR DRIVING THE SAME

FIELD OF THE INVENTION

The present invention relates to a matrix-type display device, such as an active matrix-type liquid crystal display device, having a characteristic method for sampling displayed data, and also relates to a method for driving the matrix-type display device.

BACKGROUND OF THE INVENTION

As illustrated in FIG. 8, a conventional matrix-type display device incorporates a plurality of pixel electrodes 21 (represented as PIX in the figure) arranged in matrix, and a row electrode driving circuit 22 and a column electrode driving circuit 23 for turning on/off the pixel electrodes 21. Each pixel electrode 21 is connected to a switching element 24, and opening/closing of each switching element 24 is controlled by the column electrode driving circuit 23. Display data outputted from the row electrode driving circuit 22 are supplied through the switching elements 24 to the pixel electrodes 21.

As illustrated in FIGS. 9(a) and 9(b), during one horizontal scanning period, the row electrode driving circuit 22 samples and holds a video signal $S_{in}$ inputted during one horizontal period, in synchronization with a sampling clock signal $CK_s$ during a horizontal scanning period. Then, during the next horizontal scanning period, the data thus held are supplied as display data $S_{Out}$ ($S_{out1}$, $S_{out2}$, ...) to the row electrodes in a single step. The column electrode driving circuit 23 sequentially outputs scanning signals $G_1$, $G_2$, ..., one signal per one horizontal scanning period, which cause the column electrodes to be turned on so that the display data $S_{out}$ thus supplied to the row electrodes are supplied to the pixel electrodes 21.

Thus, when the display data are supplied to the pixel electrodes 21, a display medium (liquid crystal, etc., not shown in the figures) are turned active/non-active by the pixel electrodes 21, thereby causing an image in accordance with the video signal to be displayed on a screen.

An image is displayed in a manner such that a vertical scanning is carried out with respect to each field so that the image is displayed from an upper part of the screen downward. After the scanning is completed to a lower edge of the screen, the scanning is suspended for a predetermined period of time (flyback time), and thereafter the scanning is resumed from the upper part of the screen. By repeating this process, images appear by turns on the screen.

Incidentally, TVs each having a screen at an aspect ratio of 16:9 are recently in common use, whereas TV stations have started broadcasting in a display mode for a high definition television (HDTV) and in a display mode for an extended definition television 2 (EDTV2). Therefore, among flat plate-type display devices such as liquid crystal display devices, those having laterally long screens (wide screens) come to be viewed with interest.

However, in the case where an image of the present broadcasting corresponding to the present display mode at the aspect ratio of 4:3 is displayed on the wide screen in a full display mode whereby no processing is applied, there arises a problem that display quality remarkably deteriorates. For example, an image of concentric circles appears extremely laterally long, as illustrated in FIG. 10. In the full display mode, the video signals are sampled in synchronization with rising and falling edges of a sampling clock signal $CK_s$ having a predetermined frequency, as illustrated in FIG. 13.

Therefore, in the case of a conventional CRT TV having a wide screen, an electron beam is controlled by the use of deflecting coils, so that the display quality does not deteriorate even when images in the mode for the present broadcasting are displayed. Among types of display by this method, there are a so-called normal display mode and a so-called wide display mode.

For example, in the normal display mode, an image at the aspect ratio of 4:3 is displayed only in the central part of the screen, as illustrated in FIG. 11. Therefore, the image of the concentric circles is displayed with the roundness close to 1. As a concrete method for display in the normal display mode, the Japanese Publication for Laid-open Patent Application No. 3-131182/1991 (Tokukaihei 3-131182) discloses a display method whereby an image is displayed during one effective display period (a period while an image is presented), while during a horizontal flyback period an image of a prescribed gradation level is displayed for the spaces. By this method whereby the space images are displayed during the horizontal flyback periods, a sampling frequency for sampling images is set constant.

However, since a horizontal scanning cycle, the effective display period, and the horizontal flyback period are 63.5556 μs, 52.7556 μs, and 10.8 μs, respectively, in the case of the 4:3 display mode according to the National Television System Committee (NTSC) Broadcast Standard, the image is displayed laterally longer by 10.7 percent, which is found by the following calculation:

$$((3/4)*(16/9)*(52.7556/63.5556)-1)*100=10.7$$

Note that in this case display is carried out on a screen at an aspect ratio of 16:9 in accordance with display signals supplied during one horizontal scanning period.

Therefore, in view of improving the roundness as an indicator of the display quality, it is preferable to change the sampling frequency within one horizontal period as described later. To be more specific, each sampling interval during the effective display period (effective scanning period) is preferably set 1.6283 times that during the horizontal flyback period, according to the following calculation:

$$(52.7556/10.8)/((9/3)*4/(16-(9/3)*4))=1.6283$$

By doing so, the roundness becomes 1.

Note that since a display screen size (aspect ratio) is determined from the viewpoint of production efficiency, the aspect ratio subtly varies with widths across corners of individual display screens. This is because glass substrates for the screens actually cut out from a mother glass have aspect ratios of 16:9.1, 15.9:9, etc. in the case of wide screens, so that as many glass substrates as possible can be obtained. Therefore, the use of the same sampling frequency may cause the roundness to deteriorate. Therefore, anyway, the clock frequency should be adjusted or changed.

In the wide display mode, as illustrated in FIG. 12, pictures are displayed in the same range of the screen as that in the full display mode, but the concentric circles displayed are closer to complete rounds in the center of the screen while have inferior roundness in the peripheral parts of the screen, compared with the concentric circles in the full display mode. Since attention is directed to the center of the screen due to the characteristics of human eyes, incongruity is less felt in the case of display in the wide display mode than in the case of display in the full display mode, even though the roundness deteriorates in the peripheral parts of the screen.

In the case where such display in the normal display mode or in the wide display mode is realized by the use of a matrix-type display device, it is necessary to modulate the sampling frequency within one horizontal scanning period. FIG. 13 illustrates respective examples of sampling timings in these display modes.

Note that in these examples, the sampling timings are in synchronization with rising and falling edges of a sampling clock signal.

In the normal display mode, the sampling frequency is switched so as to be lower, during the effective scanning period, than that during the horizontal flyback period. On the other hand, in the wide display mode, the sampling frequency is arranged so as to gradually change during the effective scanning period.

The following method has been proposed as a method for changing the sampling frequency as described above, so as to be applied to the matrix-type display device illustrated in FIG. 8. A sampling clock signal is obtained by dividing, by a frequency dividing circuit 26, a reference clock signal $CK_g$ generated by a reference clock oscillator 25 incorporating a crystal oscillator or a voltage control oscillator (VCO). Therefore, to change the sampling frequency, it is necessary to change either a division ratio 1/N (N is an integral number) of the dividing circuit 26, or a frequency of the reference clock signal $CK_g$.

As a method for changing the frequency of the reference clock signal $CK_g$, for example, a method whereby modulation of an oscillation frequency is carried out by voltage control by the VCO has been proposed, as disclosed in the Japanese Publication for Laid-open Patent Application No. 7-250256/1995 (Tokukaihei 7-250256).

As another method for changing the frequency of the reference clock signal $CK_g$, the use of a circuit illustrated in FIG. 14 has been proposed. The circuit has a plurality of reference clock oscillators $RG_{11}$, $RG_{12}$, ... which have different oscillation frequencies and output reference clock signals $CK_{g1}$, $CK_{g2}$, ..., respectively. One reference clock signal is selected among those above by a switching circuit 27 and is outputted as the reference clock signal $CK_g$. Thus, the reference clock signals $CK_{g1}$, $CK_{g2}$, ... are sequentially chosen as the reference clock signal $CK_g$ by switching operations of the switching circuit 27 in response to switching control signals supplied from outside, thereby causing the reference clock signal $CK_g$ to have different oscillation frequencies. The switching control signals are generated at predetermined timings based on an external clock signal which has a higher frequency than that of a horizontal synchronization signal and those of the reference clock signals $CK_{g1}$, $CK_{g2}$, ....

However, in the case where the frequency is changed by dividing, realizable frequencies are limited in view of quantization, since N of the division ratio 1/N is an integral number. Specifically, sometimes a plurality of sampling frequencies obtained are not desirable even though a frequency of the reference clock signal $CK_g$ is divided using neighboring integral numbers, since a rate of change between them is too great. For example, in the case where the reference clock signal $CK_g$ has a frequency of 20 MHz and N is set to 4 and 5, sampling frequencies obtained are 5 MHz and 4 MHz, whose rate of change is 20 percent. In some cases, practically the rate of change should be not higher than 5 percent, but such a small rate of change cannot be obtained according to the above example.

So as to lower the rate of change, N may be adjusted. For example, in the case where the reference clock signal $CK_g$ has a frequency of 95 MHz and N is set to 19 and 20, sampling frequencies of 5 MHz and 4.75 MHz are obtained, whose rate of change is 5 percent. However, since N is set to a great number, the reference clock signal $CK_g$ has an extremely high frequency, thereby causing radiation to increase and costs of the display device to rise.

In the case of the arrangement wherein the reference clock signals $CK_{g1}$, $CK_{g2}$, ... are switched from one to another, the sampling interval may become too small depending on the switching timings, thereby causing hitches in sampling operations by the row electrode driving circuit 22. Since provided as the row electrode driving circuit 22 is usually an integrated circuit composed of transistors or the like, a minimum sampling interval is determined depending on an operation frequency of the integrated circuit. Therefore, in the case where a sampling interval is set smaller than the minimum sampling interval thus determined, the reliability of the sampling operation of the integrated circuit cannot be ensured.

For example, as illustrated in FIG. 15, in the case where a reference clock signal $CK_{g1}$ and a reference clock signal $CK_{g2}$ having a cycle which is 1.5 times that of the reference clock signal $CK_{g1}$ are switched from one to the other, the following may occur since the reference clock signals $CK_{g1}$ and $CK_{g2}$ differ in phases: in the case where a switching timing in accordance with an external clock signal, for switching from the reference clock signal $CK_{g1}$ to the reference clock signal $CK_{g2}$, falls in a period where the reference clock signal $CK_{g1}$ is at a high level, a sampling interval in this case, as indicated by $t_2$, may be smaller than the other sampling intervals.

In the case where a half cycle of the reference clock signal $CK_{g1}$ is set to a sampling minimum interval $t_1$ and hence the above sampling interval $t_2$ is smaller than the minimum interval $t_1$, it is uncertain whether the sampling is carried out during a period of the sampling interval $t_2$. In the case where the sampling is not carried out, a pixel defect is caused, thereby causing the display quality to deteriorate.

On the other hand, in the case where the frequency of the reference clock signal $CK_g$ is changed in a display device having a VCO as the reference clock oscillator 25, the driving system has a complicated arrangement since a means for adjusting a control voltage is necessitated. Furthermore, there arises an inconvenience that costs of the display device rise, since a phase-locked loop (PLL) including a VCO capable of high-speed response is necessitated so that the frequency is changed during one horizontal scanning period (63.5 μs in the case of a TV signal).

SUMMARY OF THE INVENTION

The present invention is made in light of the above problems, and the object of the present invention is to restrain a rate of change of sampling frequencies without raising a frequency of a reference clock signal, to enhance reliability of sampling operations, and to realize the sampling operations with a simpler arrangement.

To achieve the above object, a method for driving a matrix-type display device comprising the steps of (a) sampling an analogue display signal of at least one horizontal scanning period in synchronization with sampling clocks, and supplying the sampled display signal to each pixel electrode row aligned in a horizontal direction among pixels provided in matrix, and (b) sequentially selecting the pixel electrode rows in a vertical direction, one pixel electrode row being selected during one horizontal scanning period, in order to supply the sampled display signal from a signal supplying circuit to the selected pixel electrode row, wherein sampling intervals are changed within one horizontal scanning period, so as to include an unequal discontinuous part even during a period when the sampling intervals are set substantially constant.

By thus driving so that the sampling intervals include an unequal discontinuous part, division ratios which are switched so as to change the sampling intervals can be set close to each other in the case where the sampling clocks are obtained by dividing reference clock signal. Usually N of a division ratio 1/N is set to an integral number, but in this case where the sampling intervals, that is, the sampling clocks, have unequal parts, N may be set to a number other than integral numbers, namely, a number having decimals. Thus, restrictions on the setting of the division ratio is relaxed, thereby allowing N to be set to a smaller number. As a result, the frequency of the reference clock signal can be set lower.

Therefore, it is possible to suppress a ratio of change of the sampling frequencies to not higher than 5 percent, even in the case with a practical reference clock frequency (around 20 MHz). Besides, since it is possible to obtain, from a single reference clock signal, any frequency lower than the frequency of the reference clock signal, there is no need to correspond the number of pixels in one screen to the frequency of the reference clock signal at a one-to-one ratio. Therefore, the same reference clock oscillator can be used even when the number of the pixels changes.

Therefore, by the present driving method, the following effect can be achieved: a matrix-type display device having a laterally long screen which is capable of displaying an image at an aspect ratio of 4:3 without giving a sense of incongruity can be realized in a simple arrangement and with lower costs. In addition, by the present driving method, it is also possible to achieve an effect that the design efficiency can be improved and standardization of components used is promoted.

Regarding the foregoing driving method, in the case where a plurality of the unequal discontinuous parts of the sampling intervals are dispersed, influences on the image by the unequal discontinuous interval are not recognized by a human eye. Thus, influences of the samplings at different intervals are reduced with the above-described arrangement, thereby ensuring that display images of a good quality can be provided without inconveniences in practical application.

Furthermore, regarding the above driving method, it is preferable that:

(1) during one horizontal scanning period the sampling intervals change substantially symmetrically with respect to a point corresponding to a center of an image; or (2) during one horizontal scanning period the sampling intervals change asymmetrically with respect to a point corresponding to a center of a screen.

With the arrangement (1), a display device having a screen at an aspect ratio of 16:9 is enabled to display images in the wide display mode or in the normal display mode. With the arrangement (2), different images can be displayed on a right half and a left half of the screen, respectively. For example, in the case where an image at an aspect ratio of 4:3 is displayed by a display device having a screen at an aspect ratio of 16:9, it is possible to display the image with a shift either to the right side or to the left side, and an image of a black level (corresponding to horizontal flyback periods) is displayed to a space.

With either the arrangement (1) or the arrangement (2), images giving less sense of incongruity can be displayed, by changing the sampling intervals during one horizontal scanning period at least either so that each interval becomes greater or so that each interval become smaller. For example, by changing the sampling intervals so that each interval becomes smaller from the center to the periphery, images displayed in the wide display mode or in the normal display mode can have a superior roundness in the central part of the screen.

To achieve the above-described object, a first matrix-type display device of the present invention includes (1) pixel electrodes provided in matrix, constituting pixel electrode rows provided in a horizontal direction, (2) a signal supplying circuit for sampling an analogue display signal of at least one horizontal scanning period in synchronization with sampling clocks, and supplying the sampled display signal to each pixel electrode row, (3) a selecting circuit for sequentially selecting the pixel electrode rows in a vertical direction so that one pixel electrode row is selected during one horizontal scanning period in order to supply the sampled display signal to the selected pixel electrode row from the signal supplying circuit, and (4) a sampling clock generator for generating sampling clocks, and changing a sampling frequency so that, even during a period while sampling intervals are set substantially equal, the sampling intervals include an unequal discontinuous part.

According to the above-described arrangement, the sampling clock generator generates sampling clocks such that sampling intervals unequal to the others are contained among the sampling intervals equal to each other. Therefore, in the case where a plurality of division ratios are selected so that a proper sampling frequency is obtained per each selection by dividing reference clock with the selected division ratio, division ratios which are switched so as to change the sampling intervals can be set close to each other. As a result, the frequency of the reference clock signal can be set lower. Besides, since it is possible to obtain, from a single reference clock signal, any frequency lower than the frequency of the reference clock signal, there is no need to anew reset the frequency of the reference clock signal when the number of the pixels in one screen changes.

Therefore, the following effect can be achieved: a matrix-type display device having a laterally long screen which is capable of displaying an image at an aspect ratio of 4:3 without giving a sense of incongruity can be realized in a simple arrangement and with lower costs. In addition, it is also possible to achieve an effect that the design efficiency can be improved and standardization of components used is promoted.

Regarding the above-described matrix-type display device, the sampling clock generator preferably has the following arrangement. Namely, the sampling clock generator includes (1) a reference clock oscillator for oscillating a reference clock signal having a predetermined constant frequency, (2) a plurality of dividing circuits for dividing the reference clock with respective division ratios and outputting the divided clock as sampling clock, at least one of the dividing circuits being an irregular dividing circuit for outputting a sampling clock including a clock of unequal interval among clocks of equal interval, the clock of unequal interval being different from the clock of equal interval in the interval thereof, (3) a switching control circuit for controlling switching timings for switching the sampling clock in accordance with a horizontal synchronization signal and the reference clock, and (4) a switching circuit for selecting one among the sampling clocks supplied from the dividing circuits and outputting it to the signal supplying circuit, while switching the selection at the switching timings.

In the above arrangement, the dividing circuits can be composed of logical circuits such as counters. The switching control circuit can be also composed of a logical circuit, since it controls switching timings in accordance with the horizontal synchronization signal and the reference clock signal. Furthermore, the switching circuit can be also composed of a logical circuit such as a data selector. Therefore, all the parts of the sampling clock generator except the reference clock oscillator, namely, the dividing circuits, the switching control circuit, and the switching circuit, can be realized with an LSI circuit such as a gate array. Since those circuits can be thus integrated, an analog processing circuit such as an operational amplifier is unnecessary. Therefore, the matrix-type display device can be realized in a simpler arrangement and with lower costs.

Furthermore, the irregular dividing circuit preferably has a division ratio set to 1/N and divides M clocks of the reference clock signal so as to obtain n clocks, M and n being integral numbers which satisfy N×n=M. With this, a correlation between the number of clocks of the sampling clock signal having the clock of unequal interval and the number of clocks of the reference clock signal, thereby ensuring that the clock of unequal interval of the sampling clock signal can be easily set. Besides, by setting n so that M is minimum, it is possible to arrange the sampling clock signal so that a difference between the equal and unequal clocks is minimum. As a result, the unequal interval of the sampling clock signal can be more easily set.

Furthermore, it is preferable that the irregular dividing circuit outputs a sampling clock in which a plurality of the clocks of unequal interval are dispersed. In an image displayed in accordance with such sampling clock signal, substantially no influence of the differences between the equal and unequal clocks is recognized by a human eye. Thus, the influence of the sampling at different intervals is reduced, thereby ensuring that display images of a good quality can be provided without inconveniences in practical application.

In addition, it is preferable that the reference clock oscillator oscillates a reference clock signal having a duty cycle of substantially 50 percent. With this arrangement, the minimum interval to determine the timing of the division are made uniform. As a result, the designing of clocks becomes easier, thereby ensuring that the unequal intervals are more easily set.

Furthermore, the sampling clock generator preferably has a characteristic that a difference of a single cycle between the equal and unequal clocks of the sampling clock signal is 0.5 clock of the reference clock signal, in addition to the characteristic that the reference clock signal has a duty cycle of substantially 50 percent. This ensures that the equal and unequal clocks have a minimum difference therebetween. Therefore, it is possible to obtain substantially uniform sampling intervals. As a result, in images displayed, influences of the unequal clocks are not noticeable, thereby enhancing the display quality.

To achieve the above-described object, a second matrix-type display device of the present invention includes (1) pixel electrodes provided in matrix, constituting pixel electrode rows provided in a horizontal direction, (2) a signal supplying circuit for sampling an analogue display signal of at least one horizontal scanning period in synchronization with sampling clocks, and supplying the sampled display signal to each pixel electrode row, (3) a selecting circuit for sequentially selecting the pixel electrode rows in a vertical direction so that one pixel electrode row is selected during one horizontal scanning period, in order to supply the sampled display signal to the selected pixel electrode row from the signal supplying circuit, (4) a plurality of reference clock oscillators for oscillating reference clocks having predetermined frequencies, respectively, (5) a switching control circuit for controlling switching timings for switching the reference clocks in accordance with a horizontal synchronization signal and one of the reference clocks which is to be selected next, so that each of sampling intervals in accordance with the sampling clocks is set not smaller than a minimum sampling interval which allows the signal supplying circuit to carry out proper sampling operations, (6) a switching circuit for selecting one among the reference clocks supplied from the reference clock oscillators, while switching the selection at a plurality of switching timings during one horizontal scanning period, and (7) a dividing circuit for dividing the selected reference clock supplied through the switching circuit with a predetermined division ratio and outputting the divided result as a sampling clock.

With the foregoing arrangement, a plurality of reference clock signals are switched so that one reference clock signal is selected. Therefore, in the case where the reference clock signals are arranged so as to have frequencies close to each other, a rate of change between sampling clocks becomes lower. Besides, since the switching timings are controlled in accordance with the reference clock signal which is to be selected in the next period, it is possible to synchronize each switching timing with the reference clock signal to be selected as a result of switching by the switching circuit. Furthermore, since the switching timings are controlled so that each sampling interval based on the sampling clocks is not smaller then the minimum sampling interval which allows the signal supplying circuit to carry out proper sampling operations, sampling clocks causing samplings at sampling intervals smaller than the minimum sampling interval are by no means outputted. In addition, as is the case with the first matrix-type display device, the dividing circuit, the switching control circuit, and the switching circuit can be realized with an LSI circuit such as a gate array.

Therefore, a matrix-type display device having a laterally long screen which is capable of displaying even an image at an aspect ratio of 4:3 without giving a sense of incongruity can be realized in a simple arrangement and with lower costs so that it conducts stable sampling operations.

In addition, in the above-described matrix-type display device, it is preferable that the reference clock signal has a duty cycle of substantially 50 percent. By thus arranging the display device, the designing of clocks becomes easier, thereby causing the unequal and equal clocks to be set more easily.

For a fuller understanding of the nature and advantages of the invention, reference should be made to the ensuing detailed description taken in conjunction with the accompanying drawings.

BRIEF DESCRIPTION OF THE DRAWINGS

FIGS. 2(a) and 2(b) are timing charts showing operations of the matrix-type display device illustrated in FIG. 1.

DESCRIPTION OF THE PREFERRED EMBODIMENTS

First Embodiment

The following description will discuss an embodiment of the present invention, while referring to FIGS. 1 through 5.

Figure 1:
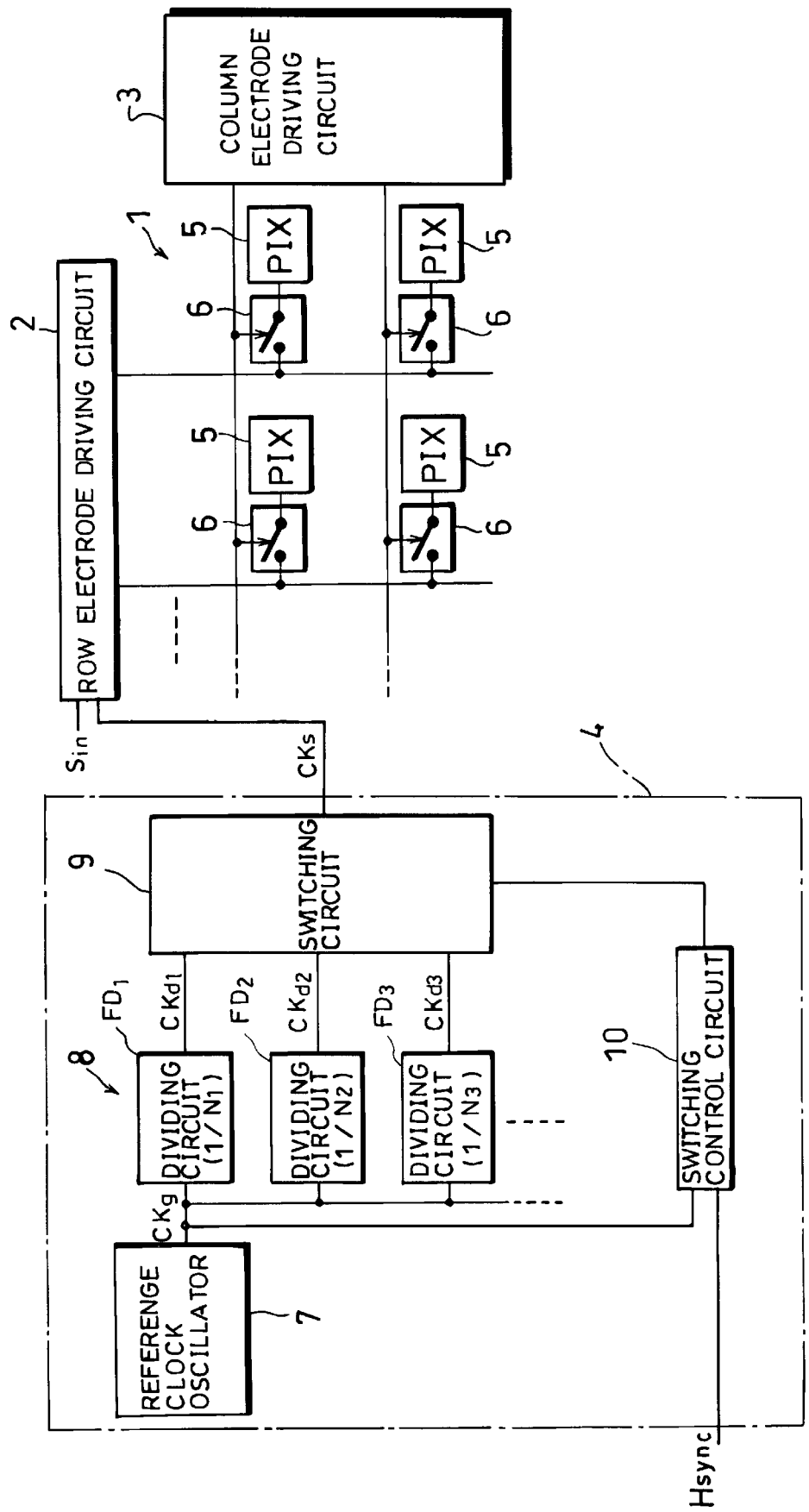
FIG. 1 is a block diagram illustrating an arrangement of a matrix-type display device in accordance with an embodiment of the present invention.

A matrix-type display device in accordance with the present embodiment has a pixel array 1, a row electrode driving circuit 2, a column electrode driving circuit 3, and a sampling clock generator 4, as illustrated in FIG. 1.

The pixel array 1 has a plurality of pixel electrodes 5 provided in matrix (represented as PIX in the figure), and switching elements 6 each of which is connected to each pixel electrode 5.

To the pixel electrodes 5, a voltage is applied for driving a display medium which is not shown. For example, in the case where the display medium is liquid crystal, the liquid crystal is driven so as to enter an active state or a non-active state, by applying a voltage across the pixel electrodes 5 and oppositely provided electrodes which are not shown.

The switching elements 6 are turned on in response to an ON signal (scanning signal) supplied thereto from the column electrode driving circuit 3 through column electrodes, and supply display data (display signal) from the row electrode driving circuit 2 to the pixel electrodes 5. In the case of the liquid crystal display device, thin film transistor (TFT) elements, metal insulator metal (MIM) elements, or the like, are used as the switching elements 6.

The row electrode driving circuit 2 as a signal supplying circuit samples a video signal $S_{in}$ supplied thereto by the use of a sampling clock signal $CK_s$ supplied from the sampling clock generator 4 (described later), and then, outputs the sampled data as display data $S_{out1}$, $S_{out2}$, . . . to the row electrodes all at once. The column electrode driving circuit 3 as a selecting circuit sequentially outputs the ON signal to the column electrodes, at a ratio of one column electrode per one horizontal scanning period, in response to a horizontal synchronization signal and a vertical synchronization signal.

In the display device having such row electrode driving circuit 2 and column electrode driving circuit 3, the scanning of the column electrodes in a vertical direction is repeated so that one scanning operation is carried out per one field. As a result, on the pixel array 1 constituting a screen, a picture in accordance with the video signal is displayed.

The sampling clock generator 4 is composed of a reference clock oscillator 7, a frequency dividing unit 8, a switching circuit 9, and a switching control circuit 10.

The reference clock oscillator 7 is arranged so as to have a frequency which can be obtained by the use of an oscillator available at stores, and so as to generate a reference clock signal $CK_g$ whose duty cycle is about 50 percent and whose frequency is constant. The reference clock oscillator 7 is composed of a crystal oscillator, or a voltage control oscillator (VCO).

The frequency dividing unit 8 is composed of a plurality of frequency dividing circuits $FD_1$, $FD_2$, . . . . The frequency dividing circuits $FD_1$, $FD_2$, . . . divide the reference clock signal $CK_g$ with division ratios of $1/N_1$, $1/N_2$, . . . , respectively, and each frequency dividing circuit is composed of a logical circuit including a counter or the like.

The switching circuit 9 selects one division clock signal among those outputted from the frequency dividing circuits $FD_1$, $FD_2$, . . . , and supplies it to the row electrode driving circuit 2 as the sampling clock signal $CK_s$. The switching circuit 9 is composed of a logical circuit such as a data selector. The switching circuit 9 switches the division clock signals during one horizontal scanning period in response to a switching control signal generated by the switching control circuit 10.

The switching control circuit 10 generates the switching control signal in accordance with the reference clock signal $CK_g$ and the horizontal synchronization signal $H_{sync}$, and is composed of a logical circuit including a counter or the like. To be more specific, the switching control circuit 10 generates the switching control signal in synchronization with the reference clock signal $CK_g$ by using the horizontal synchronization signal $H_{sync}$ for setting a reference point for the switching operation, so that the division clock signals are switched at predetermined timings in accordance with the roundness, the aspect ratio, and the display mode.

For example, the switching control circuit 10 detects how many clocks (hereinafter referred to as reference clocks) of the reference clock signal $CK_g$ have been counted by the use of a counter since the horizontal synchronization signal $H_{sync}$ was supplied, and outputs the switching timing as the switching control signal when the count reaches a value corresponding to a predetermined switching point.

Operations of the matrix-type display device thus arranged will be described below, while referring to the timing charts of FIGS. 2(a) and 2(b).

Figure 13:
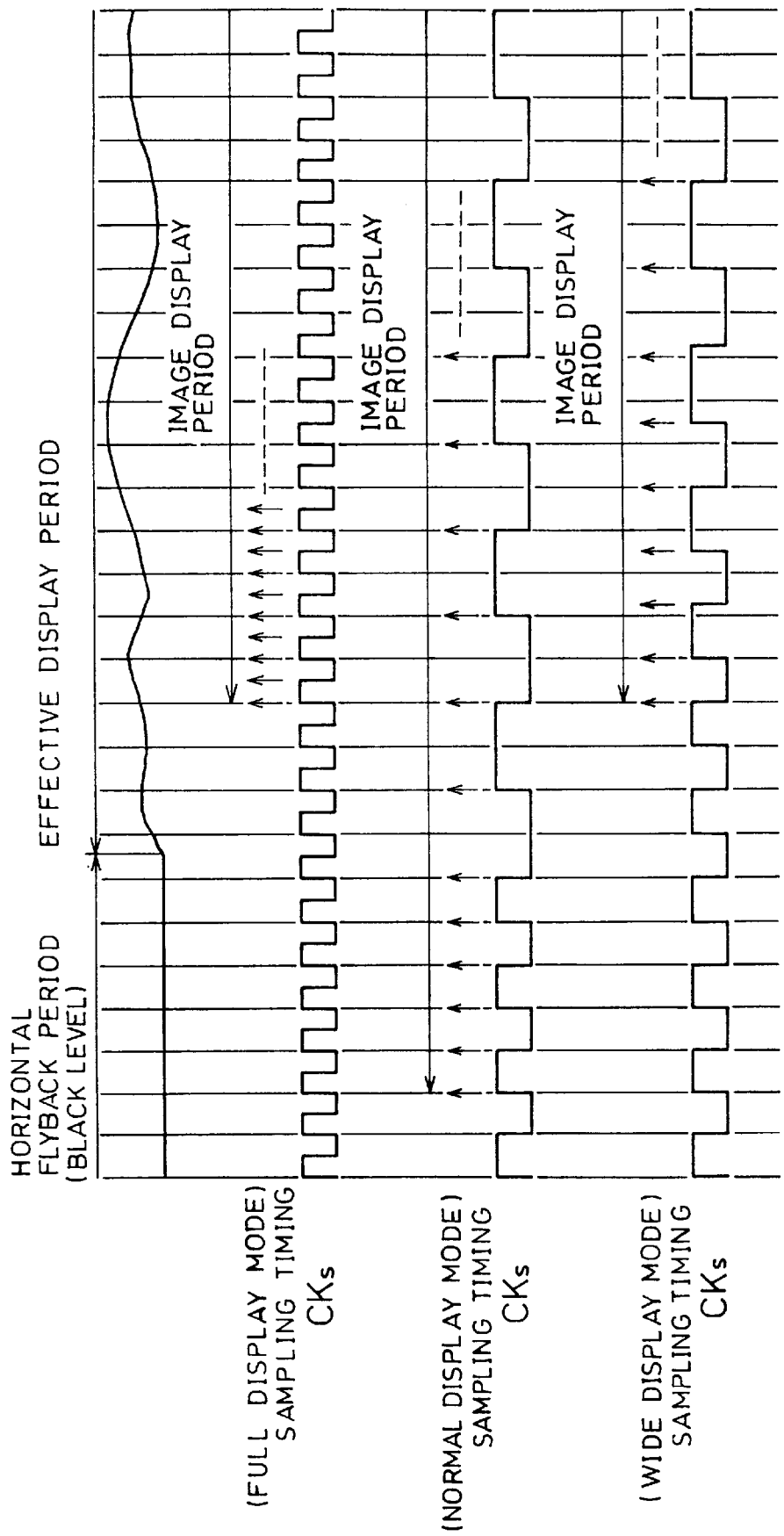
FIG. 13 is a view illustrating respective sampling clock signals and sampling timings for displaying in the full display mode, the normal display mode, and the wide display mode.
Figure 14:
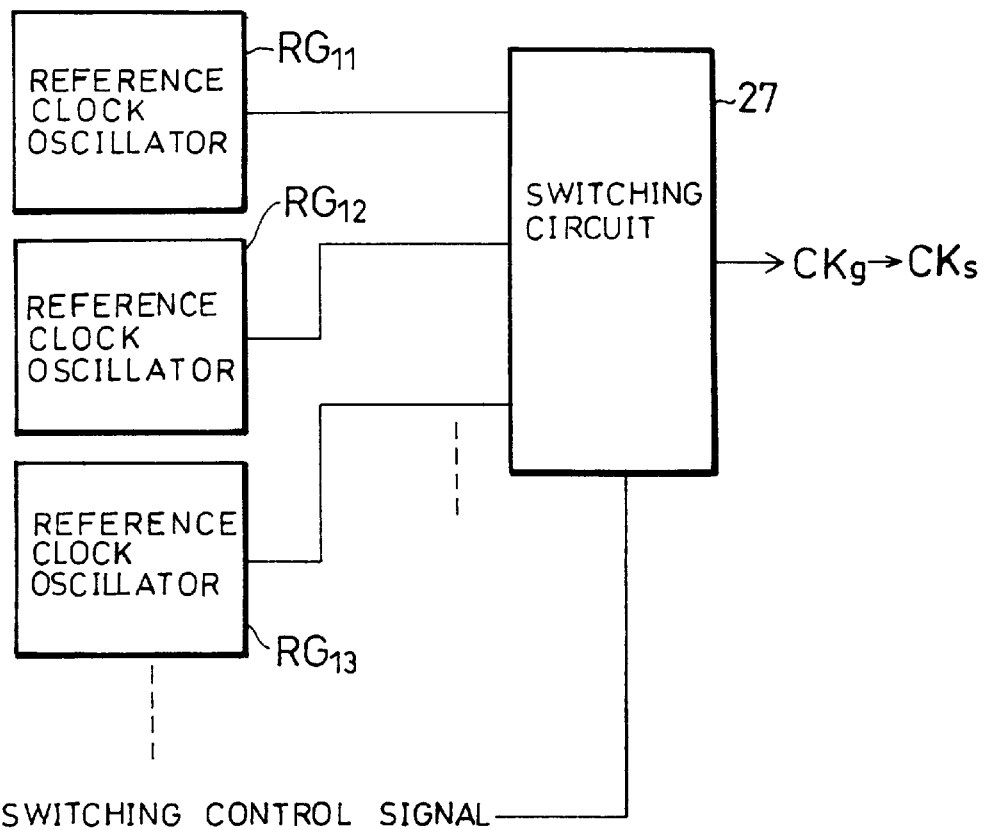
FIG. 14 is a circuit diagram illustrating a conventional circuit arrangement wherein a plurality of reference clock signals are switched so that one of them is outputted.
Figure 15:
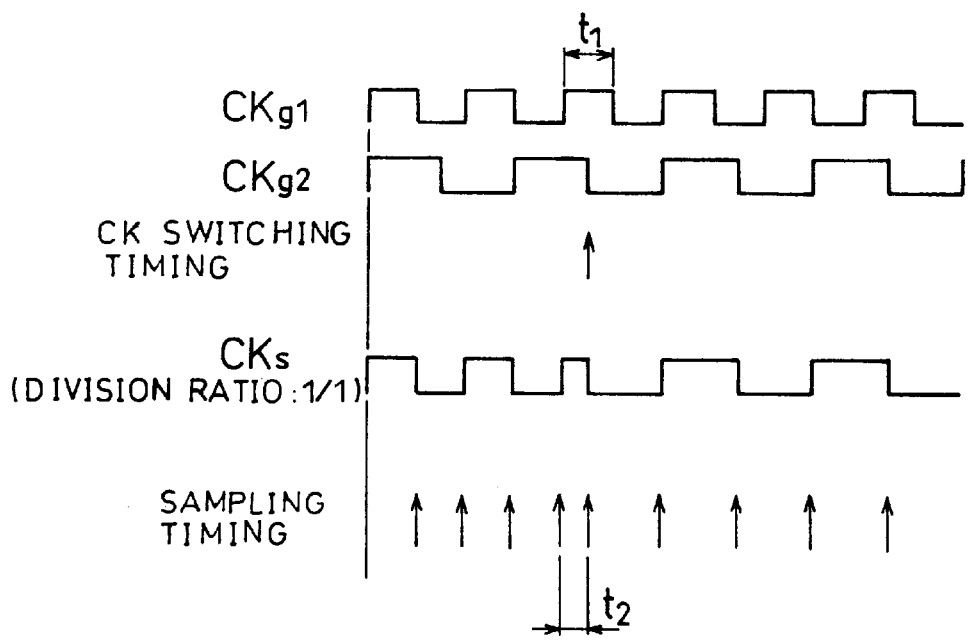
FIG. 15 is a timing chart illustrating operations of the circuitry shown in FIG. 14.

Here, described is an arrangement wherein the frequency dividing unit 8 has two frequency dividing circuits $FD_1$ and $FD_2$. The reference clock signal $CK_g$ has a frequency $f_g$ of 20 MHz, and the division ratios of $1/N_1$ and $1/N_2$ of the frequency dividing circuits $FD_1$ and $FD_2$ are set to 1/5 and 1/5.25, respectively. Besides, as in the above described case where display is carried out in the normal display mode, different sampling frequencies are selected during the horizontal flyback period and the effective display period, respectively (see FIG. 13).

Values of $N_1$ and $N_2$ as described above are determined in the following manner. In the case where the division ratio is 1/N, an integral number n is given, which satisfies that N×n is a minimum integral number M. In other words, the number of clocks obtained by dividing M (=N×n) reference clocks with the division ratio 1/N is given as n. Thus, n and M are set so that n/M=1/N. Therefore, in the case described below, M and n are set to 21 and 4, respectively.

First of all, during a horizontal flyback period of the video signal, output paths of the switching circuit 9 are switched in response to the switching control signal supplied from the switching control circuit 10 so that a division clock signal $CK_{d1}$ generated by the frequency dividing circuit $FD_1$ is outputted. Here, the reference clock signal $CK_g$ shown in FIG. 2(a), outputted from the reference clock oscillator 7, is divided by the frequency dividing circuit $FD_1$, thereby becoming 1/5. The clock signal thus obtained is supplied to the switching circuit 9 as the division clock signal $CK_{d1}$.

The division clock signal $CK_{d1}$ outputted through the switching circuit 9 is given to the row electrode driving circuit 2 as a sampling clock signal $CK_s$. Then, the row electrode driving circuit 2 samples the video signal at sampling timings indicated by arrows directed upwards in FIG. 2(a), that is, sampling timings which correspond rising and falling edges of the sampling clock signal $CK_s$.

Thereafter, during the effective display period of the video signal, output paths of the switching circuit 9 are switched in response to the switching control signal so that a division clock signal $CK_{d2}$ of the frequency dividing circuit $FD_2$ is outputted. Here, the reference clock signal $CK_g$ outputted from the reference clock oscillator 7 is divided by the frequency dividing circuit $FD_2$, thereby becoming 1/5.25. The clock signal thus obtained is outputted to the switching circuit 9 as the division clock signal $CK_{d2}$.

The division clock signal $CK_{d2}$ outputted through the switching circuit 9 is given to the row electrode driving circuit 2 as the sampling clock signal $CK_s$. Then, the row electrode driving circuit 2 samples the video signal at sampling timings indicated by arrows directed upwards in FIG. 2(b).

In the above-described case, frequencies of the sampling clock signal obtained by the frequency dividing circuit $FD_1$ and $FD_2$, that is, sampling frequencies $f_{s1}$ and $f_{s2}$, are 4 MHz and 3.8095 MHz, respectively. Therefore, a rate of change of the sampling frequencies $f_{s1}$ and $f_{s2}$ is substantially 5 percent.

Regarding the above division clock signal $CK_{d2}$, each of the second and fourth clocks, among the four clocks obtained by dividing the 21 reference clocks, has a width equivalent to five reference clocks. Besides, each first half at a high level of the first and third clocks of the division clock signal $CK_{d2}$ has a width T equivalent to three reference clocks, which is unequal to the others. Therefore, each of the first and third clocks has a total width equivalent to 5.5 reference clocks.

Therefore, the frequency dividing circuit $FD_2$ functioning as an irregular dividing circuit is arranged so that regarding (1) a clock of the division clock signal $CK_{d2}$ which substantially corresponds to the first through third reference clocks and (2) a clock of the division clock signal $CK_{d2}$ which substantially corresponds to the eleventh through fourteenth reference clocks, each of them has a width which is 0.5 reference clock more than the width of the other clocks of the division clock signal $CK_{d2}$. In other words, the frequency dividing circuit $FD_2$ causes the output level of the division clock signal $CK_{d2}$ to change per 2.5 reference clocks among the 21 reference clocks $CK_g$, except for the above-described specific clocks (i.e., clocks of unequal interval) in each of which the output level is changed with a delay equivalent to 0.5 reference clock.

As has been described, it is possible to equivalently divide the reference clock signal $CK_g$ with a division ratio of 1/5.25, by making the division clock signal including unequal discontinuous parts (i.e., clocks of unequal interval). Besides, by thus providing the unequal discontinuous parts in a dispersed manner such that the sampling frequency virtually becomes 1/5.25.

Specifically, in the case where the division ratio is 1/5.25, the sampling timings are not constant at the clock level, whereas affects of the irregular intervals (unequal intervals) cannot be recognized by human eyes when the video signals (analogue value) are sampled at the sampling interval and display is carried out in accordance with the video signals thus sampled. Therefore, even though the sampling intervals are not equal, the sampling frequency $f_{s2}$ can be regarded as 3.8095 MHz in average provided that parts whose intervals are unequal to the others are scatterd as much as possible, and practically there will be no problem. In order to make not noticeable the parts having the sampling intervals unequal to the others, positions of the clocks whose width is unequal to that of the others may be shifted per field, per horizontal scanning period, or per field and per horizontal scanning period, so that the parts are scatterd as much as possible.

Since the logical circuit operates at rising and falling of the clock, outputs of the frequency dividing circuits $FD_1$ and $FD_2$ also change only at rising and falling edges of the reference clock signal $CK_g$. In other words, the frequency dividing circuits $FD_1$ and $FD_2$ can change the outputs thereof only at intervals whose unit is 0.5 reference clock. The frequency dividing circuit $FD_1$ outputs the division clock signal $CK_{d1}$ which changes per 2.5 (=5/2) reference clocks since its division ratio is set to 1/5. On the other hand, the frequency dividing circuit $FD_2$ outputs the division clock signal $CK_{d2}$ which changes per 2.5 clocks or 3 reference clocks though its division ratio is set to 1/5.25.

As described, in the matrix-type display device of the present embodiment, the division clock signal $CK_{d2}$ has irregular cycles, thereby enabling the value of N to be lowered and allow the frequency $f_g$ to be set to a practical value. Therefore, the reference clock oscillator 7 may be composed of commericially-available parts. Besides, since the frequency $f_g$ is set to a lower value, unnecessary radiation can be greatly reduced.

According to the conventional frequency dividing method, in the case where N=5.25, the half cycle of the division clock signal $CK_{d2}$ is equivalent to 2.625 (=5.25/2) reference clocks. This means that the output of the division clock signal $CK_{d2}$ is required to change at an interval whose unit is smaller than 0.5 reference clock, but this is impossible. In contrast, the division clock signal $CK_{d2}$ obtained by the frequency dividing method of the present embodiment has unequal discontinuous parts which are different from the other parts by 0.5 clock of the reference clock $CK_g$. Therefore, the condition that N must be an integral number can be negated. As a result, any sampling clock signal $CK_s$ having a frequency not higher than the frequency $f_g$ can be obtained.

Therefore, there is no need to arrange a display device so that the number of the pixels in one screen corresponds to the frequency of the reference clock signal at a one-to-one ratio. Therefore, an inconvenience that circuitry including the reference clock oscillator 7 needs to be redesigned whenever the number of pixels changes can be avoided. Furthermore, in a display device wherein a display is carried out on a single screen in combination of the full display mode for sampling by the use of a fixed sampling frequency with the wide display mode or the normal display mode, the above-described division ratio wherein N is not an integral number may be used, when necessary, regarding a part which is displayed in the full display mode. Thus, with the matrix-type display device of the present embodiment, the design efficiency can be improved and standardization of parts used is promoted.

A difference between a cycle $T_1$ of an irregular clock and a cycle $T_2$ of a regular clock of the sampling clock signal $CK_s$ is equivalent to 0.5 reference clock, which is smallest possible. Therefore, the sampling clock signal $CK_s$ can be considered to have an averaged frequency, even though the sampling clock signal $CK_s$ contains irregular clocks having a cycle unequal to that of the others. Therefore, in images displayed by the use of the sampling clock signal $CK_s$, the affects of the irregular clocks are not noticeable, thereby giving substantially no sense of incongruity to the user.

Furthermore, each of all the parts of the sampling clock generator 4 except for the reference clock oscillator 7 is composed of a logical circuit. Namely, each of the frequency dividing unit 8, the switching circuit 9, and the switching control circuit 10 of the sampling clock generator 4 is composed of a logical circuit. Therefore, these circuits can be realized with an LSI circuit such as a gate array, thereby ensuring that the driving system including the sampling clock generator 4 can be simplified and that the costs thereof can be lowered.

Besides, since the reference clock signal $CK_g$ has a fixed frequency, a plurality of frequency dividing circuits $FD_1$, $FD_2$, ..., and the switching circuit 9 are combined so that different division clock signals as the sampling clock signal $CK_s$ are used in one horizontal scanning period and in the next horizontal scanning period. In this case, for example, the switching control circuit 10 is arranged so as to have a plurality of structures which respectively generate different switching control signals, and to switch the structures in response to an n'th (within one vertical scanning period) horizontal synchronization signal, in response to which the frequency of the sampling clock signal $CK_s$ is switched.

With this arrangement, it is possible to display images in accordance with TV video signals in the normal display mode in an upper part of the screen while displaying characters and figures created by a computer in a lower part of the screen. Since the sampling frequency should be fixed when computer images are displayed, the division of the reference clock signal $CK_g$ is carried out with N set to an integral number. On the other hand, N is set to an optimal number which is not necessarily an integral number, when TV images are displayed. With this arrangement, the switching control by the switching circuit 9 can be simplified.

Figure 3:
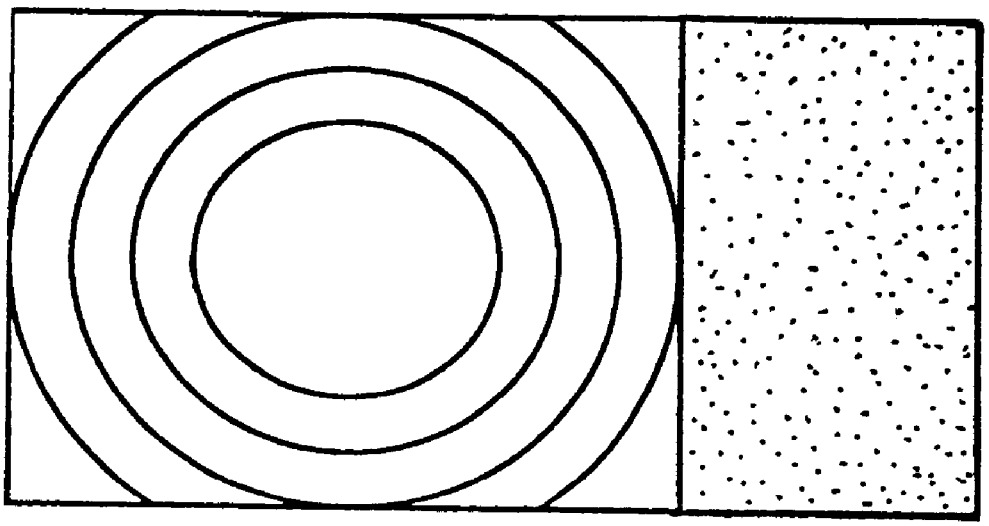
FIG. 3 is a view illustrating a screen arrangement which is possible with the matrix-type display device illustrated in FIG. 1.
Figure 11:
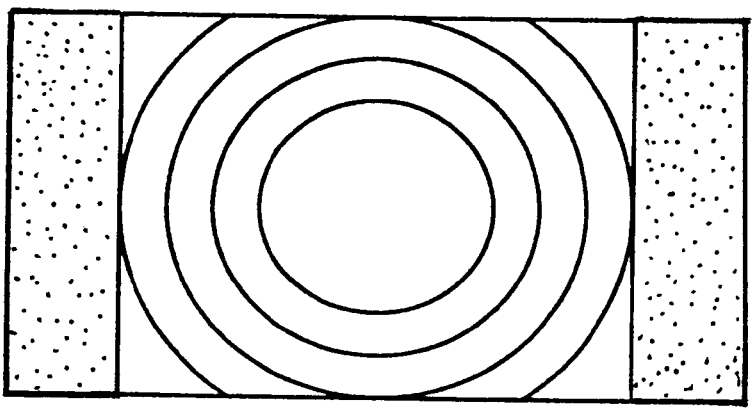
FIG. 11 is a view illustrating an image displayed in the normal display mode by a conventional display device having a laterally long screen.

Note that in the case where the image is displayed in the normal display mode by the display device of the present embodiment, a picture is usually displayed in the central part of the screen (see FIG. 11). In this case, from the left to the right of the screen the sampling timing is switched twice, namely, from a sampling timing shown in FIG. 2(*a*) to that shown in FIG. 2(*b*), then to that shown in FIG. 2(*a*). On the other hand, in the case where a picture is displayed in the normal display mode, it is possible to shift the picture to either side of the screen, as illustrated in FIG. 3, by adjusting the sampling timings. In this case, switching from either of the sampling timings shown in FIGS. 2(*a*) and 2(*b*) to the other is carried out once from the left to the right of the screen (twice during one horizontal scanning period).

Figure 4:
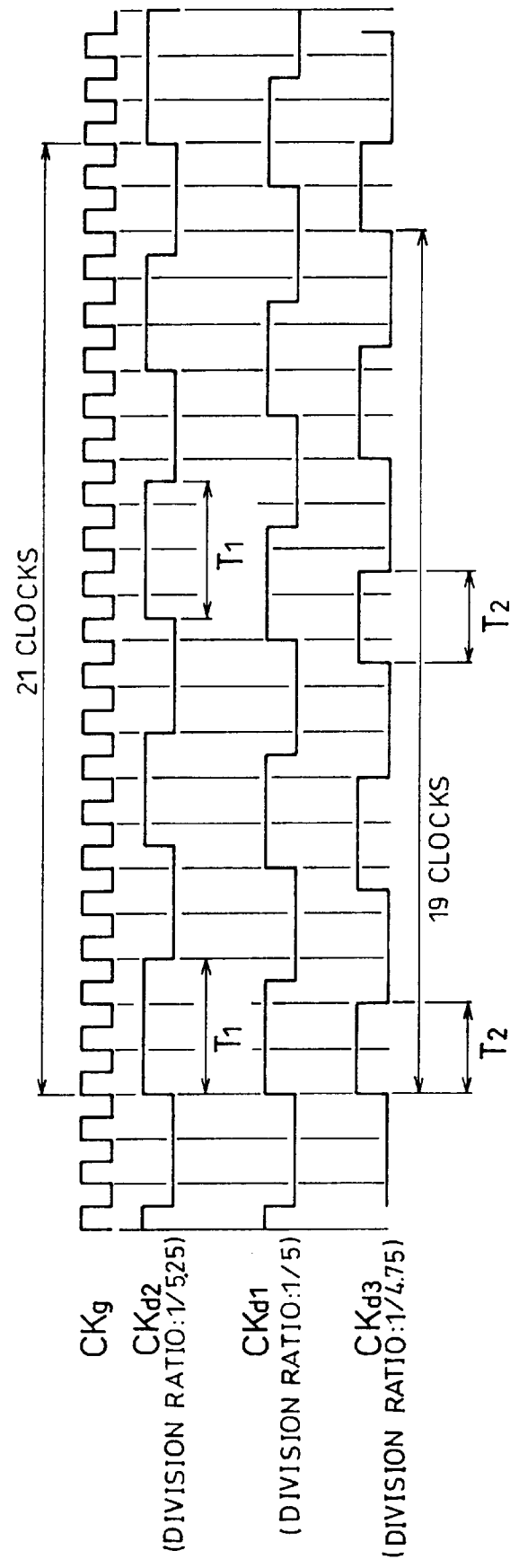
FIG. 4 is a timing chart illustrating a variation of the above matrix-type display device shown in FIG. 1.

In the above description a structure having two frequency dividing circuits $FD_1$ and $FD_2$ is discussed as an embodiment of the present invention, but the same effect described above can be obtained in the case where a display device has a structure wherein not less than three frequency dividing circuits $FD_1$, $FD_2$, ... are provided. For example, in the case of a display device wherein three frequency dividing circuits $FD_1$, $FD_2$, and $FD_3$ are provided, a division clock signal $CK_{d3}$ is obtained by setting a division ratio of the frequency dividing circuit $FD_3$ to 1/4.75, as illustrated in FIG. 4. The division clock signal $CK_{d3}$ has a frequency of 4.2 MHz and has four clocks which are obtained by frequency division with respect to 19 reference clocks.

Each of a first half of the first clock and a first half of the third clock of the division clock signal $CK_{d3}$ also has a width $T_2$ which is unequal to that of the other first and latter halves of the clocks, as is the case with the division clock $CK_2$. To be more specific, the frequency dividing circuit $FD_3$ causes the output level of the division clock signal $CK_{d3}$ to change per 2.5 reference clocks, except for the following specific clocks in each of which the output level change is advanced by 0.5 reference clock, namely, (1) a clock corresponding to the first and second reference clocks and (2) a clock substantially corresponding to the tenth through twelfth reference clocks.

Figure 5:
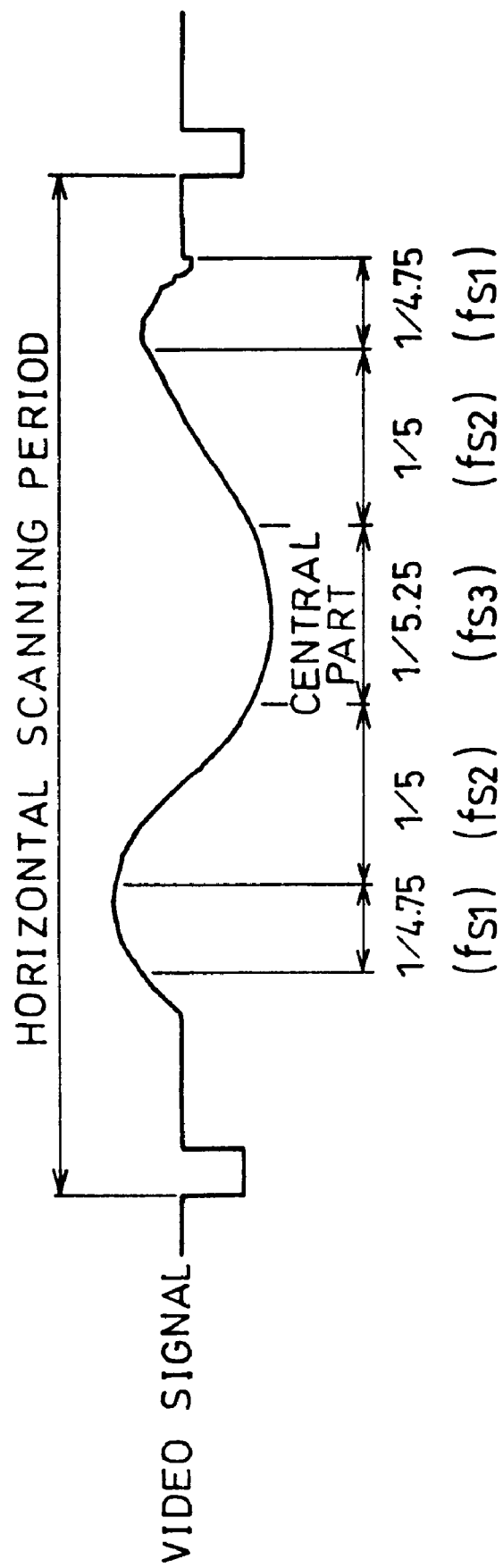
FIG. 5 is a view illustrating switching of division ratios during one horizontal scanning period in the above variation of the matrix-type display device shown in FIG. 1 and switching of sampling frequencies in a matrix-type display device in accordance with another embodiment of the present invention.

With this arrangement, as shown in FIG. 5, the division ratio is switched, from the left to the center of the screen, from 1/4.75, to 1/5, and then, to 1/5.25, and from the center to the right side of the screen, from 1/5.25, to 1/5, and then, to 1/4.75. As a result, a display suitable for the wide display mode can be realized.

Thus, with the arrangement wherein a plurality of division ratios which are close to one another are provided and division clock signals which are obtained by the use of the division ratios respectively are sequentially outputted, it appears to the user viewing the picture that modulation ratio of the image in the horizontal direction smoothly changes. Thus, the sampling frequency can be changed while giving substantially no sense of incongruity to the user, and it is possible to provide a sampling clock signal suitable for the wide display mode, as described above.

Note that in the case of the display illustrated in FIG. 3, different division ratios may be used in the left and right halves of the screen, respectively.

Second Embodiment

Figure 6:
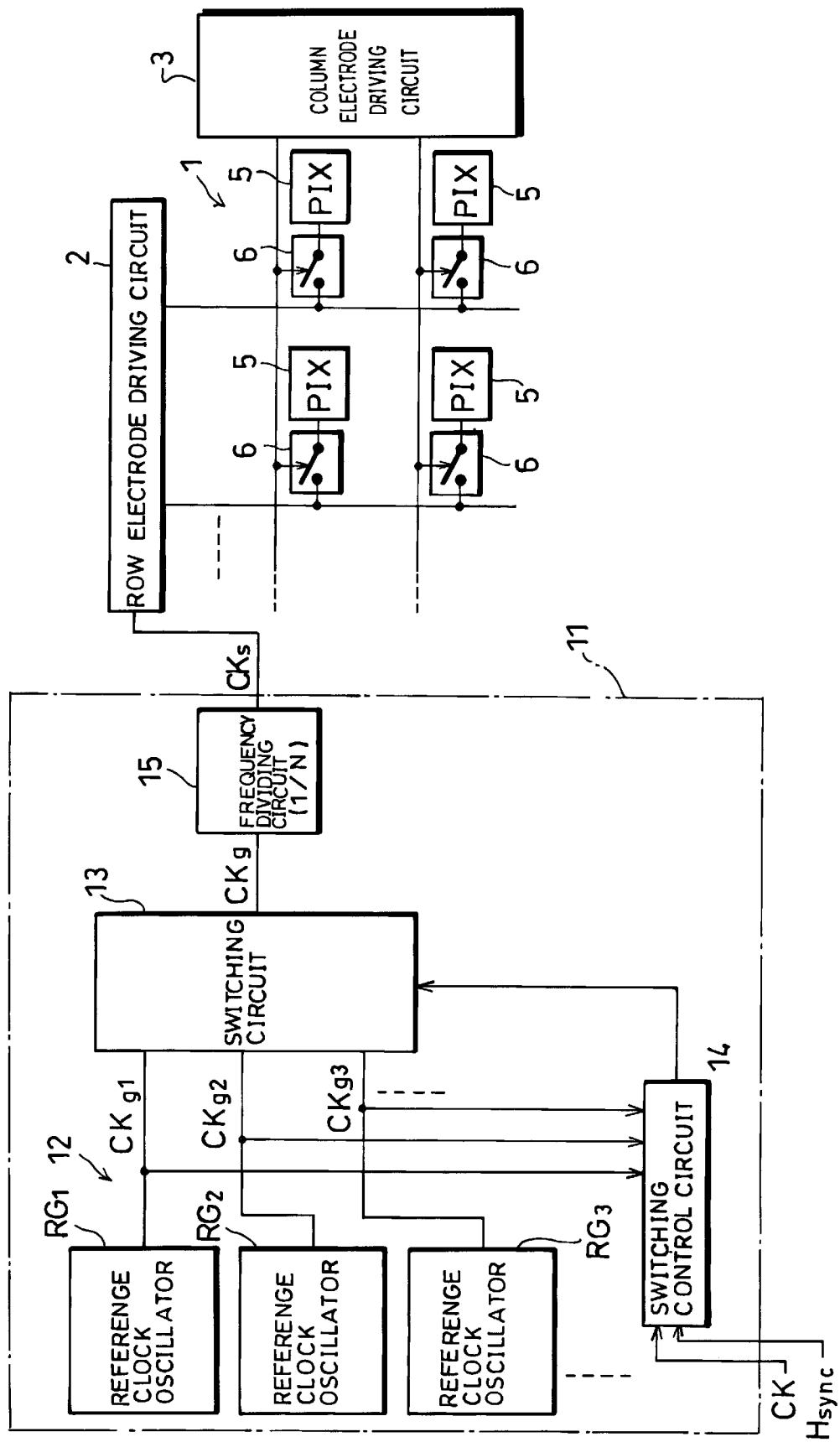
FIG. 6 is a block diagram illustrating an arrangement of the above-mentioned matrix-type display device in accordance with another embodiment of the present invention.
Figure 7:
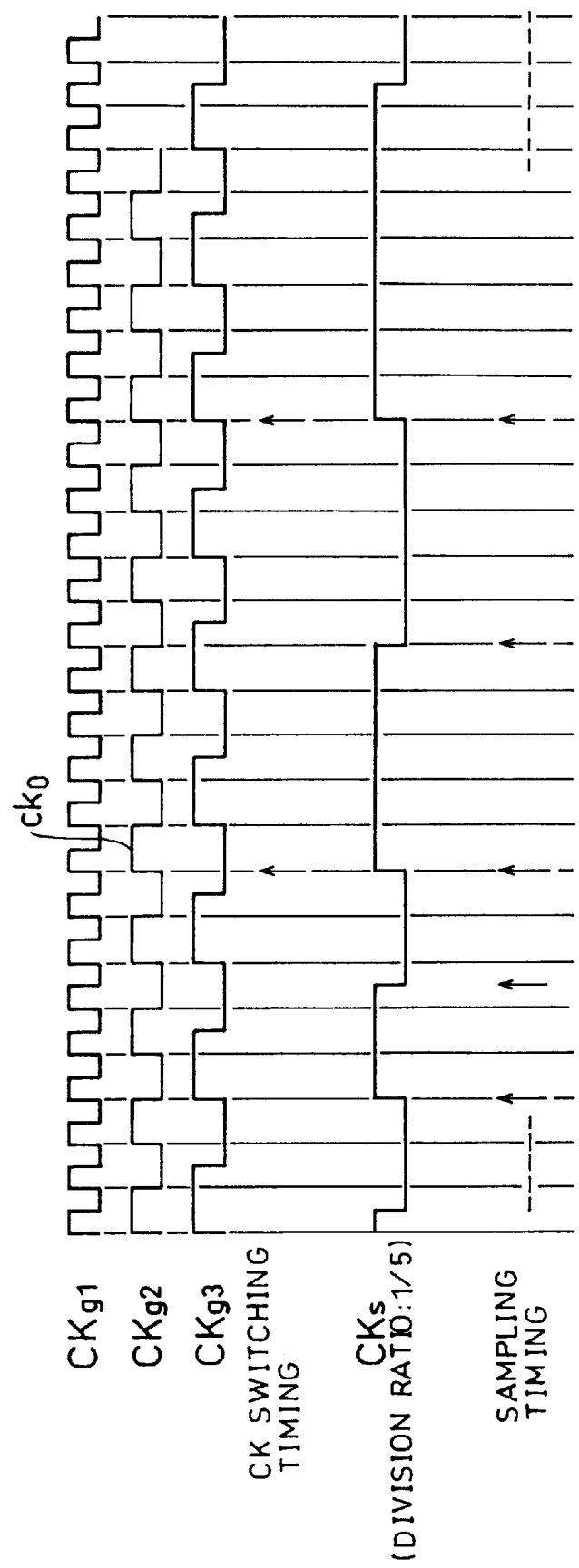
FIG. 7 is a timing chart illustrating operations of the matrix-type display device shown in FIG. 6.
Figure 8:
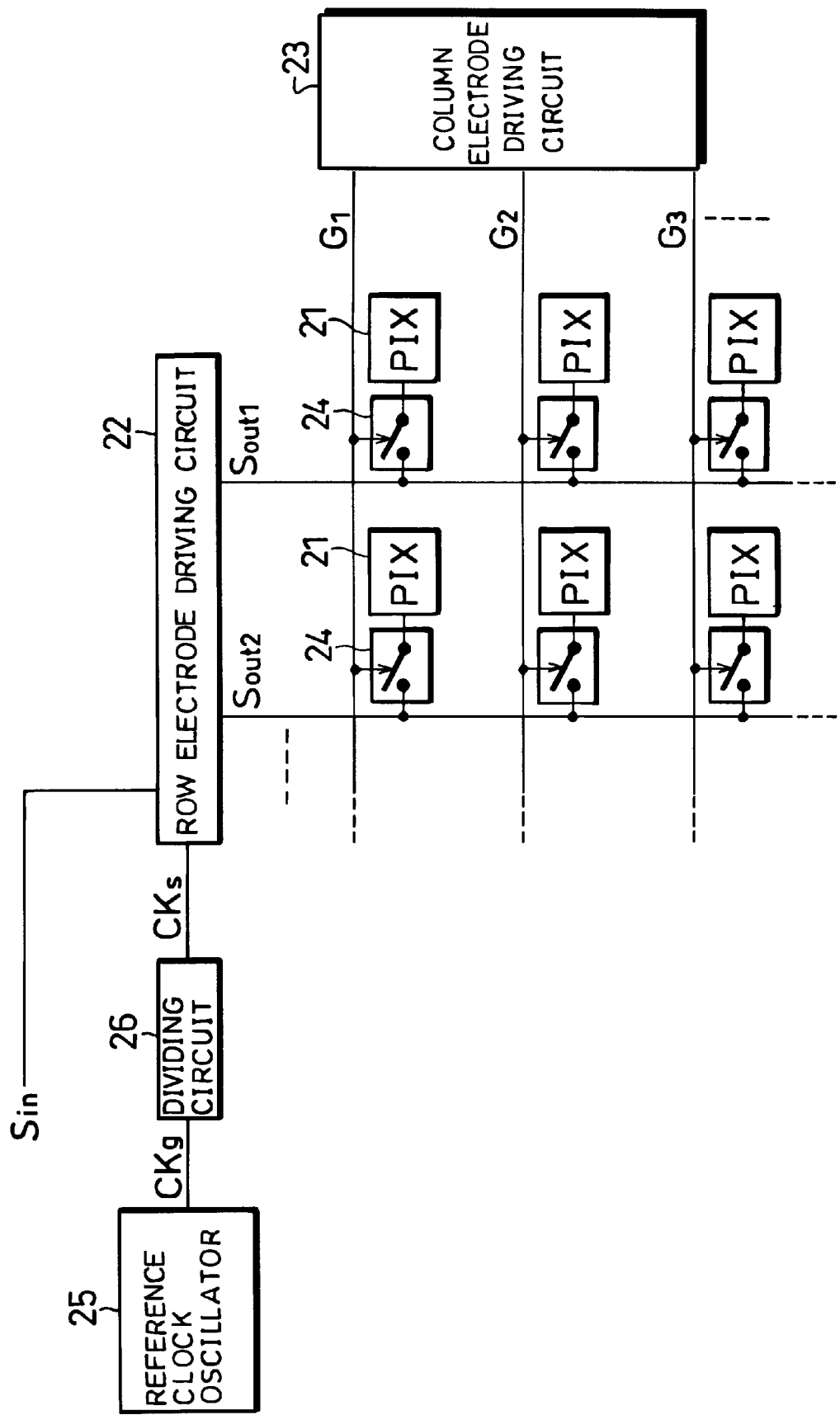
FIG. 8 is a block diagram illustrating an arrangement of a conventional matrix-type display device.
Figure 9A:
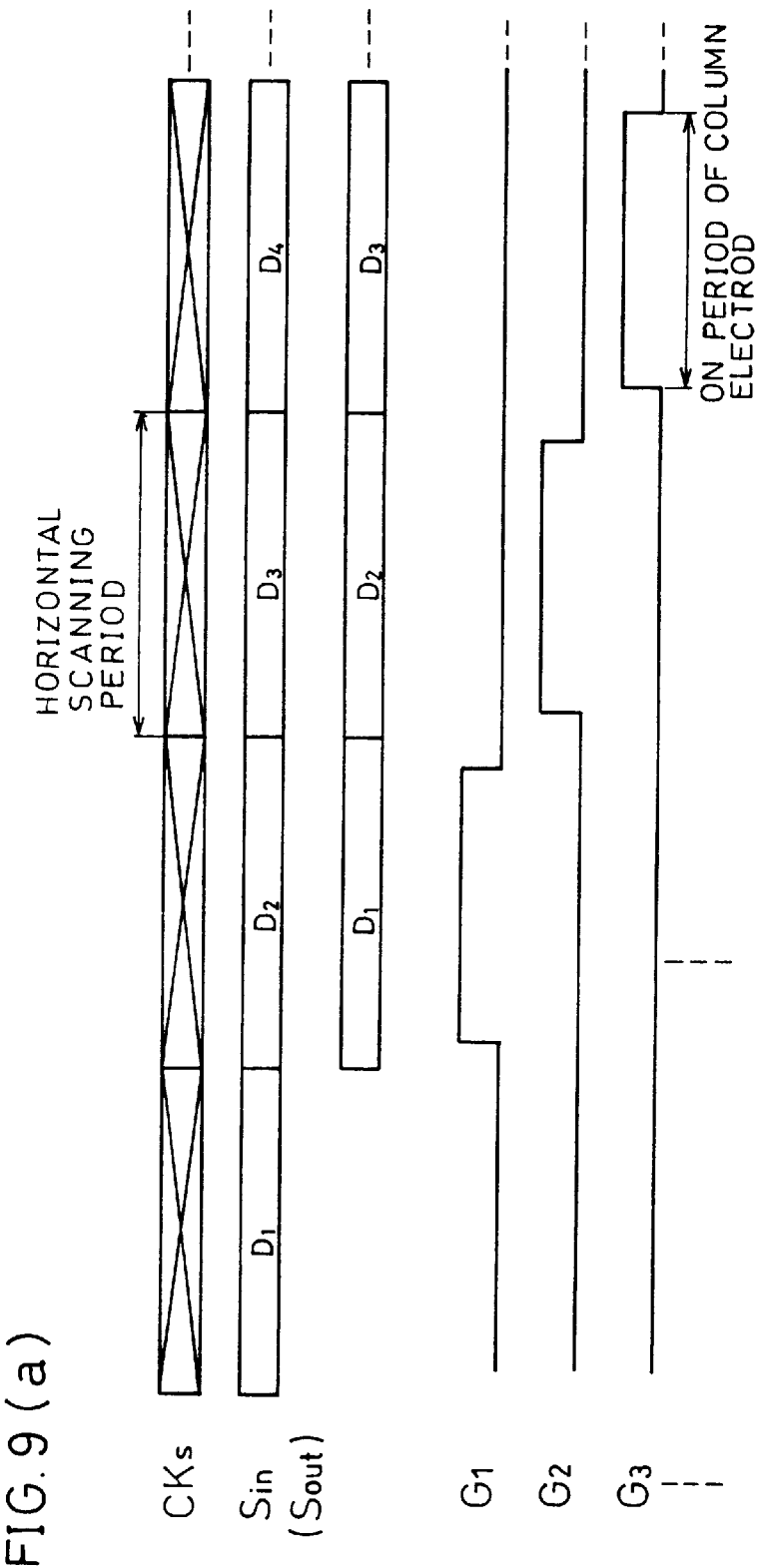
FIGS. 9(a) and 9(b) are timing charts illustrating operations of the matrix-type display device illustrated in FIG. 8.
Figure 9B:
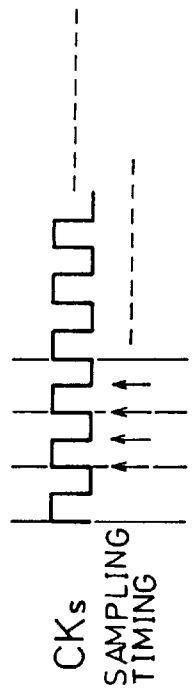
Figure 10:
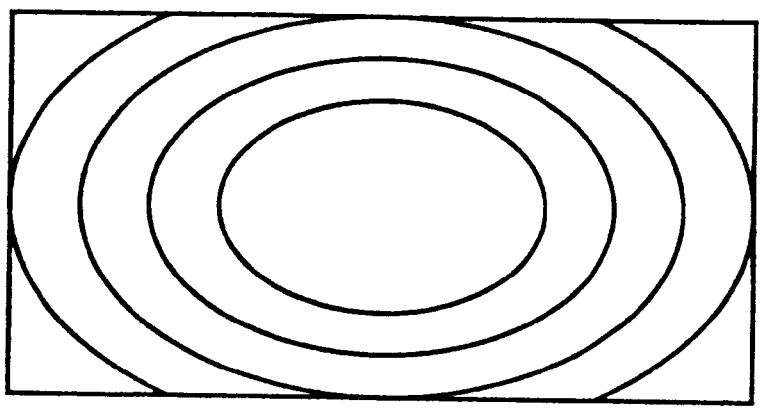
FIG. 10 is a view illustrating an image displayed in the full display mode by a conventional display device having a laterally long screen.

The following description will discuss another embodiment of the present invention, while referring to FIGS. 5 through 7. The members having the same structure (function) as those in the above-mentioned embodiment will be designated by the same reference numerals and their description will be omitted.

A matrix-type display device has a pixel array 1, a row electrode driving circuit 2, a column electrode driving circuit 3, and a sampling clock oscillating unit 11, as illustrated in FIG. 6.

The sampling clock oscillating unit 11 is composed of a reference clock oscillating section 12, a switching circuit 13, a switching control circuit 14, and dividing circuit 15.

The reference clock oscillating section 12 is composed of a plurality of reference clock oscillators $RG_1$, $RG_2$, ... The reference clock oscillators $RG_1$, $RG_2$, . . . are the same as the reference clock oscillator 7 of the first embodiment, and are arranged so as to generate reference clock signals $CK_{g1}$, $CK_{g2}$, . . . having different frequencies, respectively. Each frequency of the reference clock signals $CK_{g1}$, $CK_{g2}$, . . . is constant and has a duty cycle of around 50 percent.

The switching circuit 13, for selecting one among the reference clock signals $CK_{g1}$, $CK_{g2}$, . . . outputted from the reference clock oscillators $RG_1$, $RG_2$, . . . and outputting the selected one, is composed of a logical circuit such as a data selector. The switching circuit 13 switches the reference clock signals $CK_{g1}$, $CK_{g2}$, . . . in response to a switching control signal generated by the switching control circuit 14.

The switching control circuit 14, for outputting a switching control signal in accordance with an external clock signal CK, a horizontal synchronization signal $H_{sync}$, and the reference clock signals $CK_{g1}$, $CK_{g2}$, . . . , is composed of a logical circuit including a counter or the like. To be more specific, the switching control circuit 14 is arranged so as to generate the switching control signal having a desired switching timing in accordance with the roundness, the aspect ratio, and the display mode, by using the horizontal synchronization signal $H_{sync}$ for setting a reference point for switching operations. So as to determine switching timings, the switching control circuit 14 refers to a reference clock signal (hereinafter referred to as switching timing determining signal) to be switched by the switching circuit 13.

Note that the external clock signal CK which is not shown in the figure has a frequency lower than the lowest frequency among those of the reference clock signals $CK_{g1}$, $CK_{g2}$, . . . .

Switching timings are determined, using the count number of clocks of the external clock signal CK from the horizontal synchronization signal $H_{sync}$, so that the sampling clock signal $CK_s$ ensures a minimum sampling interval which allows the row electrode driving circuit 2 to carry out proper sampling operations. As illustrated in FIG. 7, it is preferable, regarding each timing for switching the reference clock signals which after their division are outputted as the sampling clock signal $CK_s$, that a reference clock signal is switched to another reference clock signal having a different frequency when the last cycle of the former clock signal is completed, so that during each period between two switching points the cycle of the sampling clock signal $CK_s$ is constant.

The frequency dividing circuit 15 divides one reference clock signal $CK_g$ outputted from the switching circuit 13 by a predetermined division ratio 1/N, and outputs the divided result to the row electrode driving circuit 2 as the sampling clock $CK_s$. The frequency dividing circuit 15 is composed of a logical circuit including a counter or the like.

Operations of the matrix-type display device thus arranged will be described below, while referring to a timing chart of FIG. 7. Note that FIG. 7 corresponds, for example, to a left half of the screen in the wide display mode.

Figure 12:
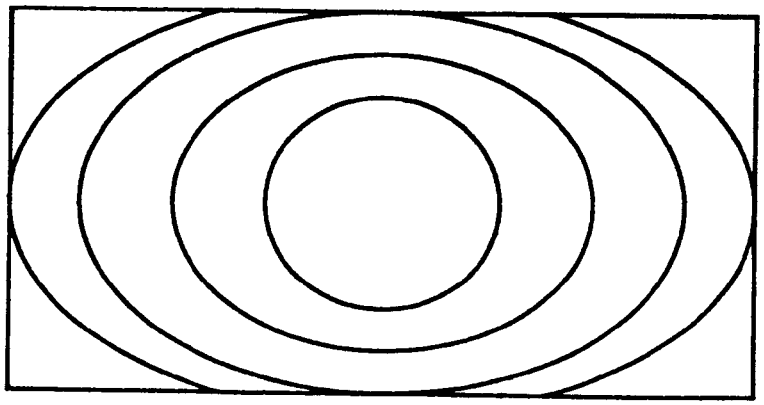
FIG. 12 is a view illustrating an image displayed in the wide display mode by a conventional display device having a laterally long screen.

Here, an arrangement wherein the reference clock oscillating section 12 has three reference clock oscillators $RG_1$, $RG_2$, and $RG_3$ is discussed. Note that the reference clock signals $CK_{g1}$, $CK_{g2}$ and $CK_{g3}$ have frequencies $f_{g1}$, $f_{g2}$, and $f_{g3}$, respectively, which satisfy $f_{g1} > f_{g2} > f_{g3}$. The division ratio of the frequency dividing circuit 15 is set to 1/5. Furthermore, in the case where display is carried out in the above-described wide display mode, the sampling frequencies are switched so that the roundness in the center of the screen is improved as compared with the roundness of the peripheral parts of the screen (see FIG. 12).

First of all, during one horizontal scanning period of the video signal, output paths of the switching circuit 13 are switched in response to the switching control signal supplied from the switching control circuit 14 so that a reference clock signal $CK_{g1}$ is outputted from the reference clock oscillating section 12. Here, the reference clock signal $CK_{g1}$ shown in FIG. 6, generated by the reference clock oscillator $RG_1$, is outputted through the switching circuit 13 as the reference clock signal $CK_g$. The reference clock signal $CK_g$ is divided by the frequency dividing circuit 15 so as to become 1/5, and the divided result is supplied as a sampling clock signal $CK_s$ (having a sampling frequency $f_{s1}$) to the row electrode driving circuit 2. Then, the row electrode driving circuit 2 samples the video signal at sampling timings indicated by arrows directed upwards in the figure.

Thereafter, the output paths of the switching circuit 13 are switched so that the reference clock signal $CK_{g2}$ is outputted. Here, for example, a high-level signal is outputted by a counter which counts clocks of the external clock signal, only while a rising edge of a clock $ck_0$ of the reference clock signal $CK_{g2}$ which is to be used next as the switching timing determining signal is detected, the rising edge of the clock $ck_0$ indicating an optimal switching timing. Immediately the high level signal is outputted, the reference clock signal $CK_{g1}$ used as the switching timing determining signal is switched to the reference clock signal $CK_{g2}$, and a switching timing is obtained by using a logical sum of the reference clock signal $CK_{g2}$ and the high level signal.

Therefore, when the reference clock signal $CK_{g2}$ of the reference clock oscillator $RG_2$ is outputted through the switching circuit 13 as the reference clock signal $CK_{g1}$, it is divided by the frequency dividing circuit 15, thereby becoming the sampling clock signal $CK_s$ (sampling frequency $f_{s2}$). In the case where the output paths of the switching circuit 13 are switched so that the reference clock signal $CK_{g3}$ is outputted, the sampling clock $CK_s$ (sampling frequency $f_{s3}$) is obtained by the use of the switching circuit 13 and the frequency dividing circuit 15. The switching from the reference clock signal $CK_{g3}$ to another reference clock signal $CK_{g1}$ or $CK_{g2}$ is carried out in the same manner.

In accordance with the switching operations of the switching circuit 13, the sampling timings are also switched.

By again switching the reference clock signal $CK_{g3}$ to the reference clock signal $CK_{g2}$, then, to the reference clock signal $CK_{g1}$, the sampling clock signal $CK_s$ is outputted whose sampling frequency is the lowest in the central part of the screen and becomes higher from the central part to the peripheral part of the screen so as to be symmetrical. Thus, by switching the output as the reference signal $CK_g$ from one to another among the reference clock signals $CK_{g1}$, $CK_{g2}$, and $CK_{g3}$ for a plurality of times during one horizontal period, it is possible to realize display in the wide display mode with the roundness closer to 1 only in the central part of the screen.

In the matrix-type display device of the present embodiment, the switching timings of the switching circuit 13 are determined so that the sampling clock signal $CK_s$ ensures a minimum sampling interval which allows the row electrode driving circuit 2 to carry out proper sampling operations. Therefore, in the case where a half cycle of the reference clock signal $CK_{g1}$ shown in FIG. 7 is equivalent to the minimum sampling interval, the sampling interval by no means becomes smaller than the minimum sampling interval, thereby ensuring suitable sampling operations.

With the above arrangement, in the case where the frequencies $f_{g1}$, $f_{g2}$, and $f_{g3}$ of the reference clock signals $CK_{g1}$, $CK_{g2}$, and $CK_{g3}$ are set to 8.4 MHz, 8.0 MHz, and 7.6 MHz, respectively, and the division ratio is 1/2, results obtained as the sampling frequency $f_s$ by dividing the frequencies are 4.2 MHz, 4.0 MHz, and 3.8 MHz, respectively. This sampling frequency $f_s$ is substantially the same as that of the arrangement of the first embodiment wherein three frequency dividing circuits are provided.

Furthermore, in the present embodiment as well, all the parts of the sampling clock oscillating unit 11 except for the reference clock oscillating section 12 are composed of LSI circuits such as gate arrays, thereby ensuring that the driving system including the sampling clock oscillating unit 11 can be simplified and that the costs thereof can be decreased.

In the first and second embodiments the external clock signal CK is supplied from outside, but an equivalent clock signal may be obtained inside the sampling clock generator 4 in the case of the first embodiment and inside the sampling clock oscillating unit 11 in the case of the second embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for driving a matrix-type display device comprising the steps of:
   (a) sampling an analogue display signal of at least one horizontal scanning period in synchronization with sampling clocks, and supplying the sampled display signal to each pixel electrode row aligned in a horizontal direction among pixels provided in matrix; and
   (b) sequentially selecting the pixel electrode rows in a vertical direction, one pixel electrode row being selected during one horizontal scanning period, in order to supply the sampled display signal from a signal supplying circuit to the selected pixel electrode row,
   wherein the sampling clocks are generated by dividing a reference clock with a first division ratio and adding an unequal clock signal to the division result, the unequal clock being generated by dividing the reference clock with a second division ratio, the second division ratio being different from the first division ratio.

2. The method as set forth in claim 1, wherein a plurality of the unequal clocks are dispersed.

3. The method as set forth in claim 1, wherein during one horizontal scanning period the sampling intervals are changed substantially symmetrically with respect to a point corresponding to a center of an image.

4. The method as set forth in claim 3, wherein during one horizontal scanning period the sampling intervals are changed at least either so as to become greater or so as to become smaller.

5. The method as set forth in claim 1, wherein during one horizontal scanning period the sampling intervals are changed asymmetrically with respect to a point corresponding to a center of an image.

6. The method as set forth in claim 5, wherein during one horizontal scanning period the sampling intervals are changed at least either so as to become greater or so as to become smaller.

7. A matrix-type display device, comprising:
   pixel electrodes provided in matrix, constituting pixel electrode rows provided in horizontal direction;
   a signal supplying circuit for sampling an analogue display signal of at least one horizontal scanning period in synchronization with sampling clocks, and supplying the sampled display signal to each pixel electrode row;
   a selecting circuit for sequentially selecting the pixel electrode rows in a vertical direction so that one pixel electrode row is selected during one horizontal scanning period in order to supply the sampled display signal to the selected pixel electrode row from said signal supplying circuit; and
   a sampling clock generator for generating sampling clocks by dividing a reference clock with a first division ratio and changing a sampling frequency during one horizontal scanning period by adding an unequal clock signal in the division result, the unequal clock signal being generated by dividing the reference clock with a second division ratio, the second division ratio being different from the first division ratio.

8. The matrix-type display device as set forth in claim 7, wherein said sampling clock generator includes:
   a reference clock oscillator for oscillating reference clocks having a predetermined constant frequency;
   a plurality of dividing circuits for dividing the reference clock with respective division ratios and outputting the divided clock as sampling clock, at least one of said dividing circuits being an irregular dividing circuit for outputting a sampling clock including a clock of unequal interval among clocks of equal interval, the clock of unequal interval being different from the clock of equal interval in the interval thereof;
   a switching control circuit for controlling switching timings for switching the sampling clock in accordance with a horizontal synchronization signal and the reference clock; and
   a switching circuit for selecting one among the sampling clocks supplied from said dividing circuits and outputting it to said signal supplying circuit, while switching the selection at the switching timings.

9. The matrix-type display device as set forth in claim 8, wherein said irregular dividing circuit has a division ratio set to 1/N and divides M clocks of the reference clocks so as to obtain n clocks, M and n being integral numbers which satisfy N×n=M.

10. The matrix-type display device as set forth in claim 9, wherein n is set so that M is minimum.

11. The matrix-type display device as set forth in claim 8, wherein said irregular dividing circuit outputs a sampling clock in which a plurality of the clocks of unequal interval are dispersed.

12. The matrix-type display device as set forth in claim 8, wherein said reference clock oscillator oscillates a reference clock having a duty cycle of substantially 50 percent.

13. The matrix-type display device as set forth in claim 12, wherein a difference of a single cycle between the clock of equal interval and the clock of unequal interval is 0.5 clock of the reference clock.

14. The matrix-type display device as set forth in claim 7, characterized in being a liquid crystal display device conducting display by driving liquid crystal.

15. The matrix-type display device as set forth in claim 14, wherein each pixel electrode is provided with a switching element.

16. A matrix-type display device as set forth in claim 7, further comprising a display screen at an aspect ratio of 4:3 or laterally longer.

* * * * *